United States Patent
Ozawa et al.

(10) Patent No.: US 7,010,976 B2
(45) Date of Patent: Mar. 14, 2006

(54) ACCELERATION SENSOR AND MANUFACTURING METHOD THEREOF

(75) Inventors: Nobuo Ozawa, Tokyo (JP); Takasumi Kobayashi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 10/900,389

(22) Filed: Jul. 28, 2004

(65) Prior Publication Data
US 2005/0056096 A1 Mar. 17, 2005

(51) Int. Cl.
G01C 19/00 (2006.01)
G01P 15/00 (2006.01)
G01P 15/125 (2006.01)
H01L 21/00 (2006.01)

(52) U.S. Cl. .................. 73/504.12; 73/514.38; 73/514.33; 73/514.32; 438/53

(58) Field of Classification Search ............... 73/514.32–514.34, 514.38, 504.12; 438/53, 438/379; 361/280, 283.3, 283.4
See application file for complete search history.

(56) References Cited
U.S. PATENT DOCUMENTS
6,293,149 B1 * 9/2001 Yoshida et al. .......... 73/514.01
6,772,632 B1 * 8/2004 Okada ..................... 73/514.38

FOREIGN PATENT DOCUMENTS
JP 10048243 A * 2/1998

* cited by examiner

Primary Examiner—Hezron Williams
Assistant Examiner—Tamiko Bellamy
(74) Attorney, Agent, or Firm—Volentine Francos & Whitt, PLLC

(57) ABSTRACT

There is provided a compact, high-sensitivity acceleration sensor. The acceleration sensor includes a weight 8, a pedestal 9 arranged around the periphery of the weight 8, a support frame 3 formed to have a width narrower than the width of the pedestal 9 all around its perimeter, a mass 2 attached to the weight 8 to retain the weight 8 inside the support frame 3, beams 4 connecting the support frame 3 and the mass 2 and overlapping the pedestal 9 near their ends on the side of the support frame 3, and a peripheral interlayer 12 arranged between the support frame 3 and the pedestal 9 to create a predetermined clearance between the pedestal 9 and the parts of the beams 4 that overlap the pedestal 9.

12 Claims, 8 Drawing Sheets

ACCELERATION SENSOR AND MANUFACTURING METHOD THEREOF

BACKGROUND OF THE INVENTION

1. Field of the Invention

The present invention relates to an acceleration sensor that detects a change in resistance, capacitance, or voltage caused by the displacement of a mass supported by beams to determine acceleration, and a manufacturing method of the same.

2. Description of the Related Art

Acceleration sensors are divided by sensing method into three types: piezoresistive, capacitive, and piezoelectric. For such types of acceleration sensors, there is known a structure in which a mass is supported by beams so that a change in resistance, capacitance, or voltage caused by the displacement of the mass will be detected to determine acceleration. In this structure, the longer the beams, the higher the sensitivity of the sensor. However, as the acceleration sensor becomes smaller in size, there arises a problem that the length of the beams becomes too short for the acceleration sensor to have sufficient sensitivity.

Such an acceleration sensor that determines acceleration based on the displacement of the mass supported by the beams is described in Patent document 1 to be listed below. The acceleration sensor is formed by bonding first and second semiconductor substrates together. On the first semiconductor substrate, the mass, the beams, and a support frame arranged around the periphery of the mass are formed, with one end of each beam secured to the support frame. On the second semiconductor substrate, a weight for increasing the displacement of the mass and a pedestal supporting the support frame are formed. In the structure of this acceleration sensor, the pedestal is formed to have two widths: one larger than the width of the support frame, the other smaller than that of the support frame. The wider part of the pedestal limits the excess downward movement of the mass, and the narrower part limits the excess upward movement of the weight relative to the movement of the support frame, thus controlling the vertical motion of the mass and weight.

In the structure described in Patent Document 1, (See, JP-A-10-048243, Pages 4 to 5, FIGS. 1, 4, and 5) the beams and the support frame are formed in a conventional manner, but the pedestal is formed with partially different widths. However, as the acceleration sensor is micro-miniaturized in this structure, since the length of the beams becomes short, it runs the danger of reducing the accuracy of detection. Further, in the manufacturing method of the acceleration sensor, two semiconductor substrates are processed separately, and then bonded together. Thus the manufacturing processes are complicated and difficult to reduce manufacturing costs.

SUMMARY OF THE INVENTION

An object of the present invention is to provide a compact, high-sensitivity acceleration sensor.

Another object of the present invention is to simplify the manufacturing processes of the acceleration sensor.

An acceleration sensor according to the present invention includes a weight, a pedestal, a support frame, a mass, and beams. The pedestal is arranged around the periphery of the weight. The support frame is arranged along the pedestal, and formed to have a width narrower than the width of the pedestal all around its perimeter. The mass is attached to the weight to retain the weight inside the support frame. The beams connect the support frame and the mass, and overlap the pedestal at their ends on the support frame side.

A manufacturing method of an acceleration sensor according to the present invention includes first to fourth steps. In the first step, a multiplayer substrate with fist and second layers formed on both sides of a third layer is prepared. In the second step, the first layer is etched to form a mass, a support frame surrounding the periphery of the mass, and beams connecting the mass and the support frame. In the third step, the second layer is etched to form a pedestal arranged along the support frame, and a weight secured to the mass inside the pedestal. In the fourth step, the third layer exposed through first and second grooves is removed.

According to the present invention, since the acceleration sensor is formed in such a manner that the width of the support frame is narrower than the width of the pedestal all around its perimeter, the beams can be extended by a length corresponding to the reduced width of the support frame so that the parts of the beams will overlap the pedestal near their ends on the support frame side. Therefore, even when the acceleration sensor is made more compact, the deterioration of detection sensitivity can be prevented, thereby providing a compact, high-sensitivity acceleration sensor.

According to the present invention, since the manufacturing method of the acceleration sensor uses a multilayer substrate with the first and second layers formed on both sides of the third layer, and processes the first and second layers formed on opposite sides to each other by etching and the like to process the third layer by etching and the like, thus manufacturing the acceleration sensor. Since this method does not need the process to bond the substrates, it makes easier the manufacturing processes of the acceleration sensor.

DETAILED DESCRIPTION OF THE INVENTION

(1) Structure

Figure 6:
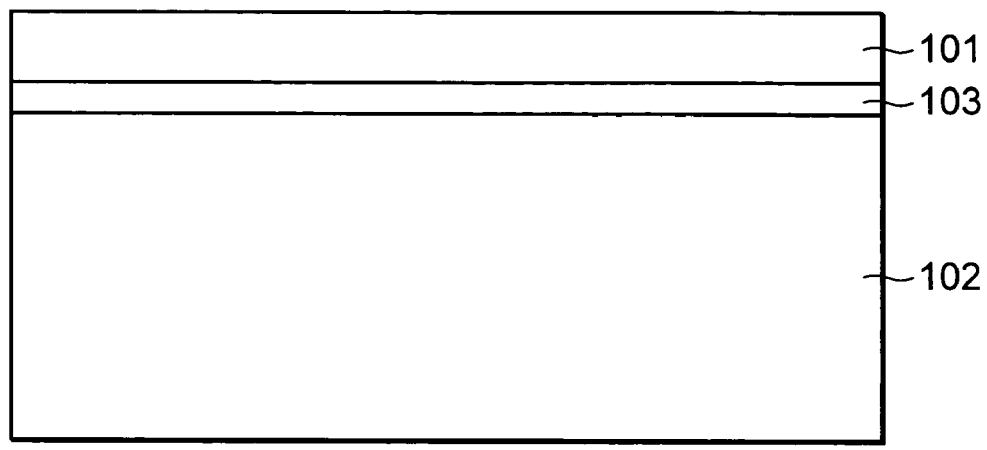
FIG. 6 shows a manufacturing process of the acceleration sensor (step 1).

An acceleration sensor according to the present invention will now be described by taking as an example a piezoresistive acceleration sensor 1 manufactured using an SOI (Silicon-On-Insulator) substrate as shown in FIG. 6. The SOI substrate is a semiconductor substrate with a first semiconductor film 101 and a second semiconductor film 102 formed on both sides of a dielectric film 103. In this case, the first semiconductor film 101 and the second semiconductor film 102 are made of Si, and the dielectric film 103 is $SiO_2$.

Figure 1:
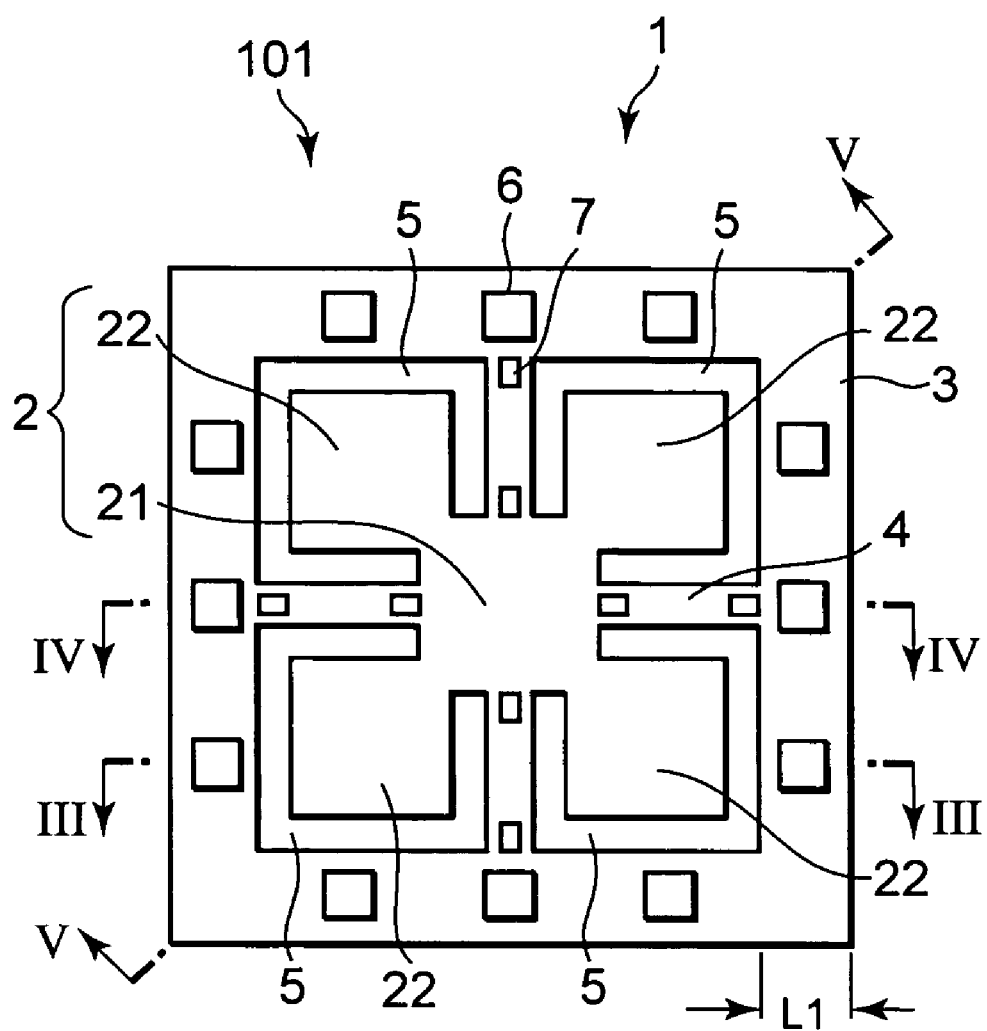
FIG. 1 is a plan view of an acceleration sensor.
Figure 2:
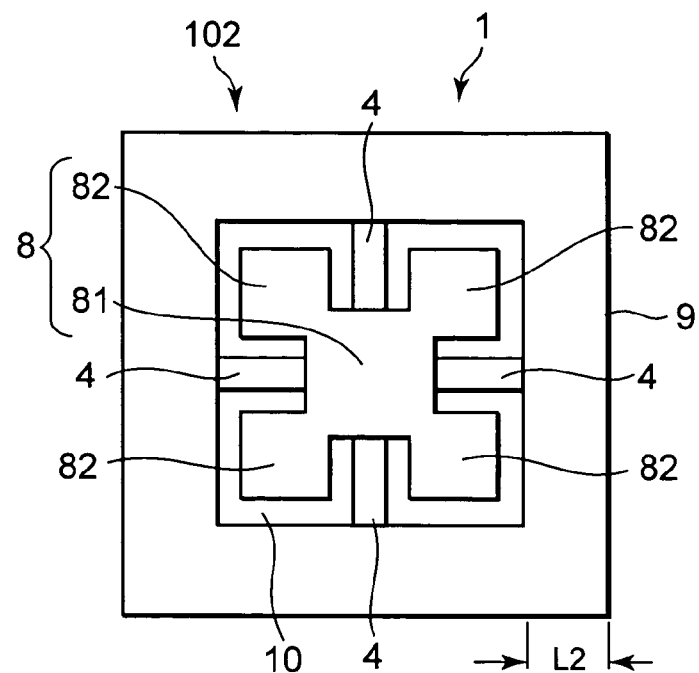
FIG. 2 is a bottom view of the acceleration sensor.
Figure 3:
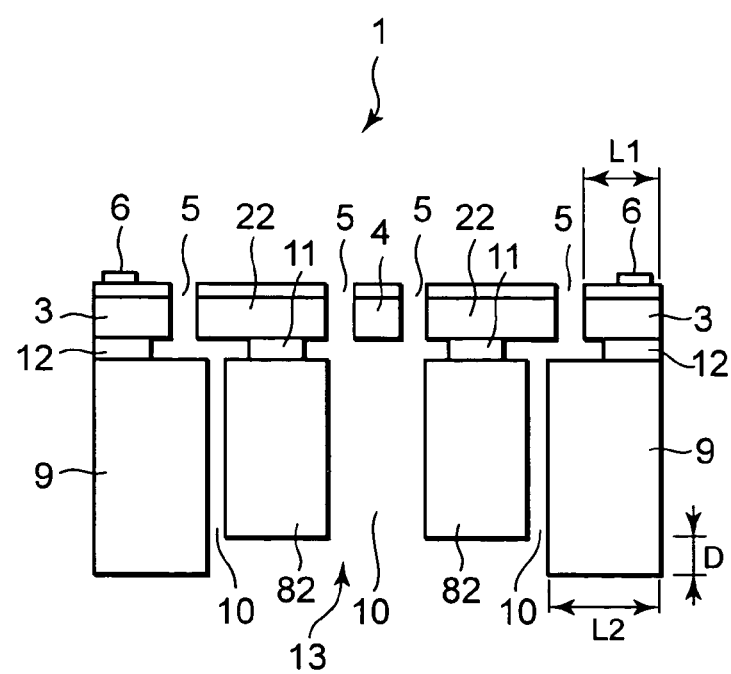
FIG. 3 is a sectional view taken along the line III—III of FIG. 1.
Figure 4:
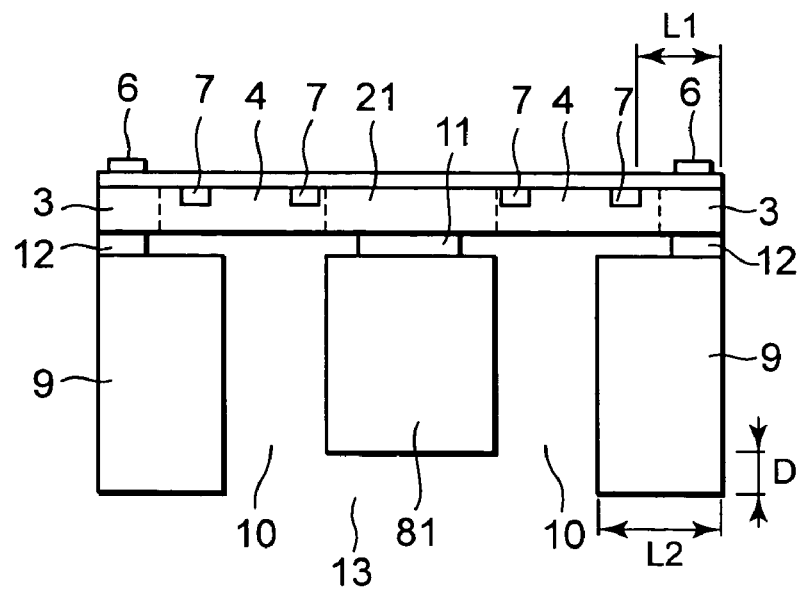
FIG. 4 is a sectional view taken along the line IV—IV of FIG. 1.
Figure 5:
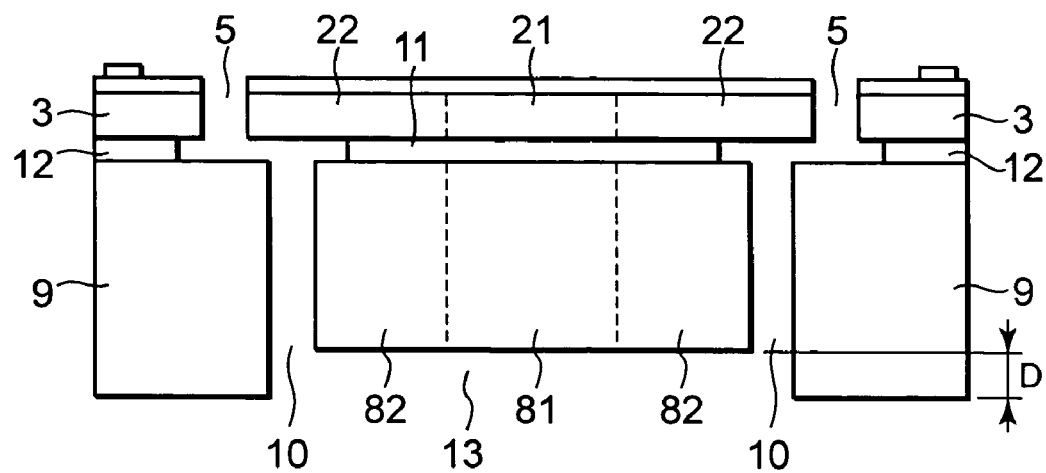
FIG. 5 is a sectional view taken along the line V—V of FIG. 1.

FIG. 1 is a plan view of the acceleration sensor 1 as viewed from the side of the first semiconductor film 101. FIG. 2 is a bottom view of the acceleration sensor 1 as viewed from the side of the second semiconductor film 102. FIG. 3 is a sectional view taken along the line III—III of FIG. 1, FIG. 4 is a sectional view taken along the line IV—IV of FIG. 1, and FIG. 5 is a sectional view taken along the line V—V of FIG. 1.

As shown in FIG. 1, the first semiconductor film 101 is divided by first grooves 5 into semiconductor regions to form a mass 2, a support frame 3, and beams 4, respectively.

The mass 2 is composed of a central mass element 21 having a substantially rectangular cross-section, and four peripheral mass elements 22 each having a substantially rectangular cross-section. The peripheral mass elements 22 are formed in the four corners of the central mass element 21 in such a manner that they are integrated with the central mass element 21.

The support frame 3 is an element having the shape of a substantially rectangular frame, which is formed around the mass 2, that is, the central mass element 21 and the four peripheral mass elements 22. The support frame 3 is formed to have a width (first width L1) narrower than the width (second width L2) of a pedestal 9, to be described later, all around its perimeter. To be more specific, as shown in FIGS. 3 to 5, the outside perimeter of the support frame 3 is substantially equal to that of the pedestal 9. However, since the first width L1 of the support frame 3 is narrower than the second width L2 of the pedestal 9 by an amount (L2-L1), the inside perimeter of the support frame 3 is formed more outward than that of the pedestal 9. On the upper surface of the support frame 3, electrode pads 6 are arranged at predetermined intervals so that a signal from each piezoresistor will be sent from a corresponding one of the electrode pads 6 to the outside of sensor.

The beams 4 are plate-like elements connecting the central mass element 21 of the mass 2 and the support frame 3 in such a manner that the center line of each beam substantially passes through the center of the central mass element 21 and the center of each side of the support frame 3. The beams 4 are flexible to bend with the vertical and horizontal movement of the mass 2. As shown in FIG. 4, since the first length L1 of the support frame 3 is narrower than the second width L2 of the pedestal 9 all around the inside perimeter of the support frame 3, the beams overlap the pedestal 9 at their end on the support frame side by an amount (L2-L1), that is, the beams are extended by a length along which the beams 4 overlap the pedestal 9.

On the upper surface of each beam 4, piezoresistors 7 are formed at predetermined intervals so that the resistance of each piezoresistor 7 will vary as the beams bend up and down or sideways. Although the wiring connecting the piezoresistors 7 to the electrode pads 6, and a protective film covering the wiring are not shown for the sake of simplifying the explanation, a signal varied with the resistance of a piezoresistor 7 is sent from a corresponding electrode pad 6 to an external calculation circuit through a wire not shown. In the embodiment, the mass 2, the support frame 3, and the beams 4 are formed to have substantially the same thickness.

As shown in FIG. 2, the second semiconductor film 102 is divided by second grooves 10 into semiconductor regions to form a weight 8 and the pedestal 9, respectively.

The weight 8 is composed of a central weight element 81 having a substantially rectangular cross-section, and four peripheral weight elements 82 each having a substantially rectangular cross-section. The peripheral weight elements 82 are formed in the four corners of the central weight element 81 in such a manner that they are integrated with the central weight element 81. As shown in FIG. 4, the central weight element 81 is fixed to the undersurface of the central mass element 21 through a mass-weight interlayer 11 that is smaller in area than the central mass element 21 and the central weight element 81. On the other hand, as shown in FIG. 3, each of the four peripheral weight elements 82 is fixed to the undersurface of each of the peripheral mass elements 22 through each mass-weight interlayer 11. As shown in FIGS. 3 and 5, each of the peripheral weight elements 82 is small in area than each of the peripheral mass elements 22 all around its perimeter, and the mass-weight interlayer 11 is smaller in area than the peripheral weight element 82. Further, as shown in FIGS. 3 and 4, a recess 13 is formed inside the pedestal 9 to provide a step height corresponding to a predetermined distance D between the end face (bottom face) of the weight 8 (81 and 82) and the end face (bottom face) of the pedestal 9. The step height is provided to prevent the weight 8 from bumping against a case when the weight 8 is displaced in the case in which the acceleration sensor 1 is mounted.

As shown in FIG. 2, the pedestal 9 is an element having the cross-section of a substantially rectangular frame surrounding the weight 8, that is, the central weight element 81 and the four peripheral weight elements 82. The pedestal 9 has the second width L1 that is wider than the first width L1 of the support frame 3 all around its perimeter. The second width L2 of the pedestal 9 is set enough to ensure the mechanical strength of the acceleration sensor 1. As shown in FIGS. 3 to 5, the pedestal 9 is fixed to the undersurface of the support frame 3 through a peripheral interlayer 12 formed of the dielectric film 103. The peripheral interlayer 12 is smaller in area than the support frame 3 and the pedestal 9.

(2) Manufacturing Processes

The manufacturing processes of the acceleration sensor 1 will be described below. FIGS. 6 to 15 are sectional views taken along the line IV—IV of FIG. 1, illustrating the manufacturing processes in order of flow.

Figure 7:
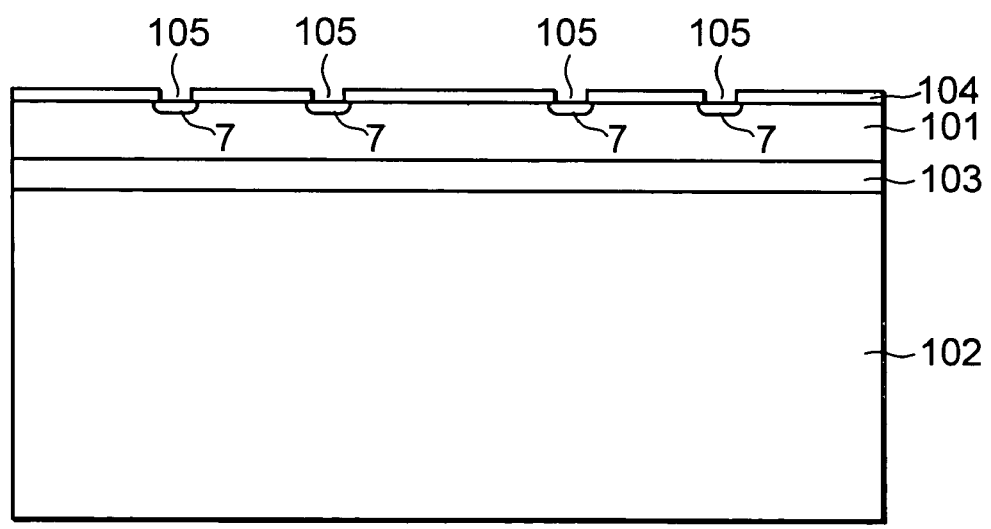
FIG. 7 shows a manufacturing process of the acceleration sensor (step 2).

First, the SOI substrate shown in FIG. 6 is prepared. Then, as shown in FIG. 7, an oxide film 104 of, for example, 4000 Å is formed on the surface of the first semiconductor film 101 at a thermal oxidation temperature of 1000° C. in a humidified atmosphere, and micro-pores or openings 105 are formed in the oxide film 104 by the photolithography and etching technique. Next, p-type diffusion regions as the piezoresistor 7 are formed by boron diffusion through the openings 105.

Figure 8:
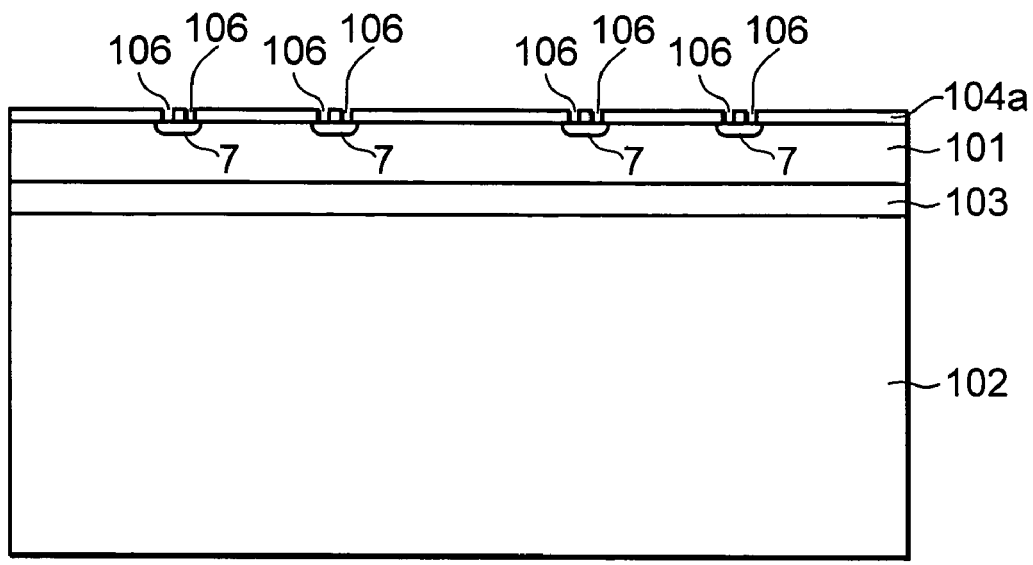
FIG. 8 shows a manufacturing process of the acceleration sensor (step 3).
Figure 9:
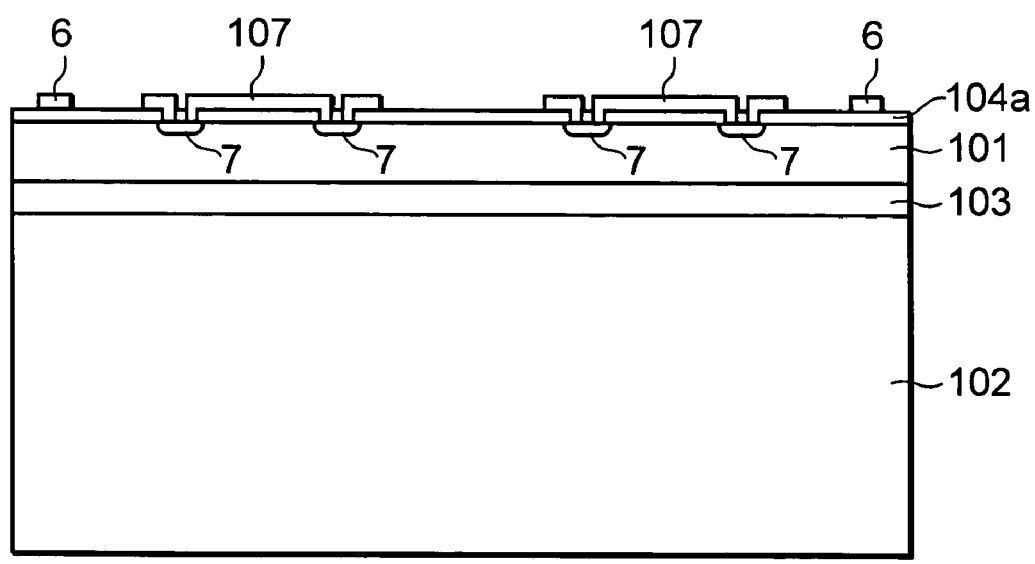
FIG. 9 shows a manufacturing process of the acceleration sensor (step 4).
Figure 10:
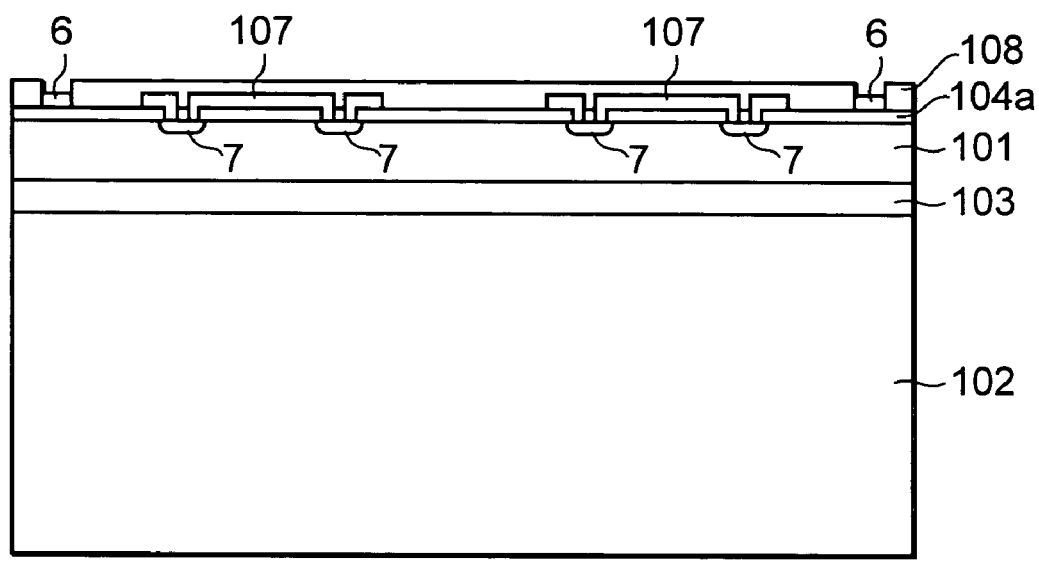
FIG. 10 shows a manufacturing process of the acceleration sensor (step 5).

After that, a protective oxide film is deposited by CVD (Chemical Vapor Deposition) to form an oxide film 104a over the surface of the oxide film 104, and contact holes 106 are formed in the oxide film 104a as shown in FIG. 8 using the photolithography and etching technique. Next, as shown in FIG. 9, an aluminum film is deposited and laminated by metal sputtering, and processed by the photolithography and etching technique to form wiring 107 and the electrode pads 6. Next, as shown in FIG. 10, a silicon nitride film is deposited by PVD (Plasma Vapor Deposition) to laminate a protective film 108, and the electrode pads 6 are exposed by the photolithography and etching technique.

After that, a resist pattern is formed on the protective film 108, and the protective film 108 and the first semiconductor film 101 are processed by etching to form the first grooves 5 as shown in FIG. 1, thus forming the mass 2, the support frame 3, and the beams 4, all of which are divided by the first grooves 5. As mentioned above, the width of the support frame 3 is formed to have the first width L1 narrower than the width (second width L2) of the pedestal 9 all around its perimeter.

Figure 11:
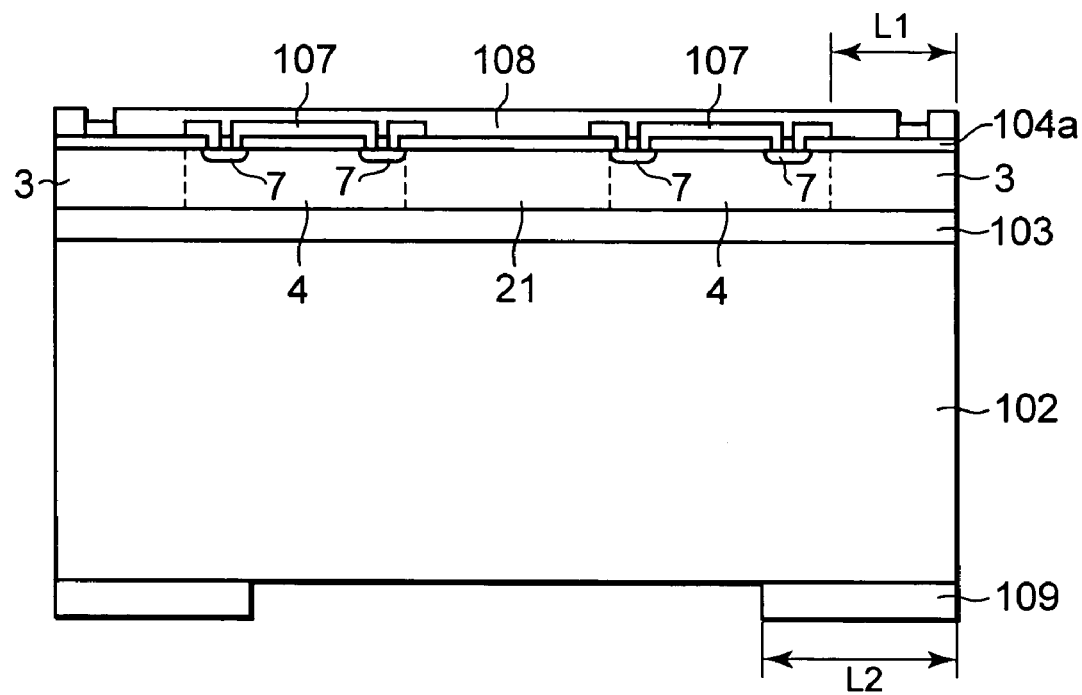
FIG. 11 shows a manufacturing process of the acceleration sensor (step 6).
Figure 12:
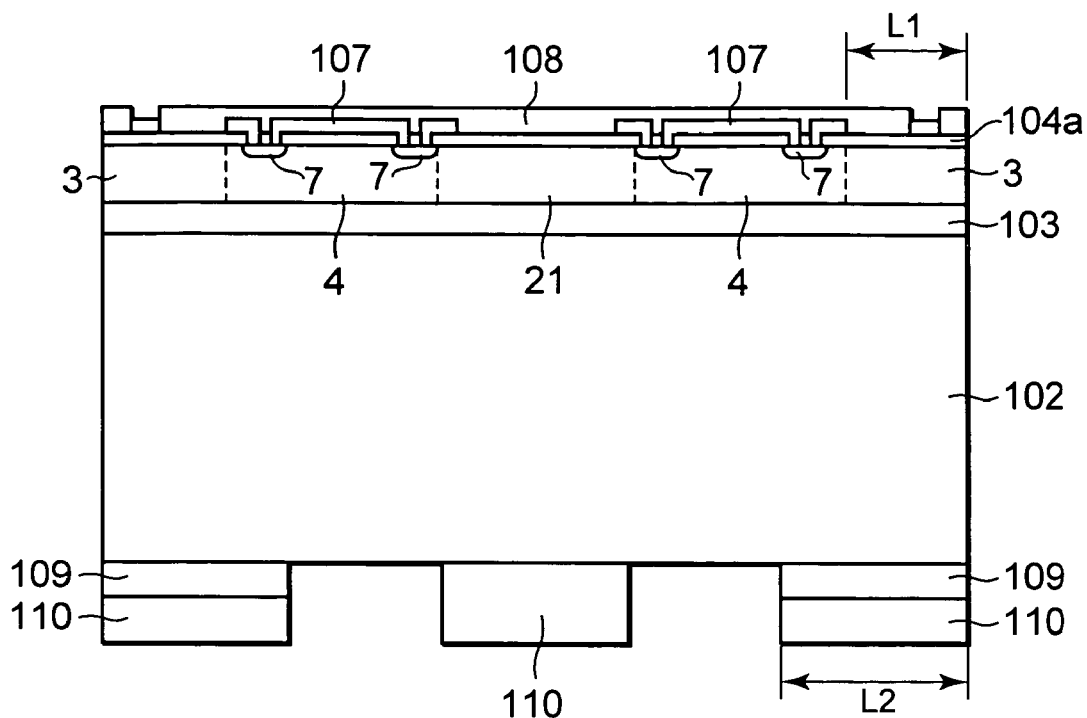
FIG. 12 shows a manufacturing process of the acceleration sensor (step 7).
Figure 13:
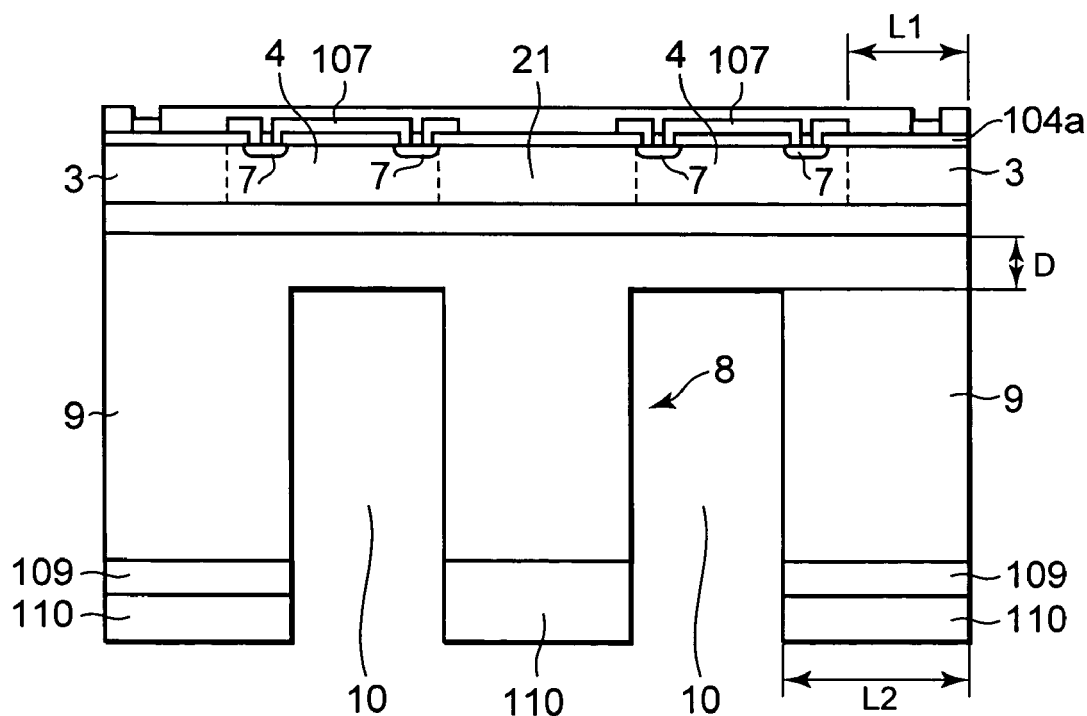
FIG. 13 shows a manufacturing process of the acceleration sensor (step 8).

Next, as shown in FIG. 11, an oxide film 109 is deposited and laminated by CVD on the surface of the second semiconductor film 102, and processed by the photolithography and etching technique to etch the oxide film 109 in such a manner that the oxide film 109 will remain intact in the region for the pedestal 9. After removing the resist, a resist pattern 110 is formed as shown in FIG. 12 to expose the regions corresponding to the second grooves 10. Using the resist pattern 110, the second semiconductor film 102 is etched by gas chopping etching technology (GCET) as shown in FIG. 13 to form the second grooves 10. The formation of the second grooves 10 divides the weight 8 and the pedestal 9, leaving a predetermined thickness D in the second semiconductor film 102 between the bottom face of each second groove 10 and the dielectric film 103.

Figure 14:
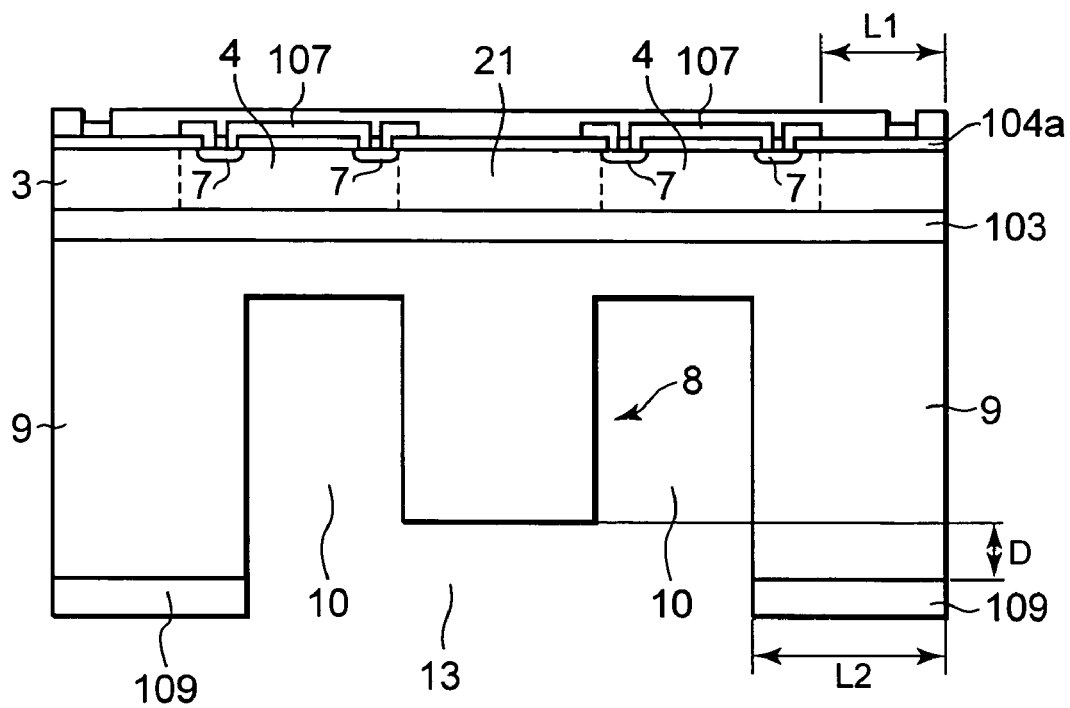
FIG. 14 shows a manufacturing process of the acceleration sensor (step 9).

After that, as shown in FIG. 14, the resist pattern 110 is removed, and gas chopping etching is performed using the oxide film 109 as a hard mask to etch the second semiconductor film 102 remaining between the bottom surface of each second groove 10 and the dielectric film 103, thus exposing the dielectric film 103. At this time, the end face (bottom face) of the weight 8 is also etched to the predetermined thickness D to form the recess 13 inside the pedestal 9, thereby forming the step height corresponding to the predetermined thickness D between the end face (bottom face) of the weight 8 and the end face (bottom face) of the pedestal 9.

Figure 15:
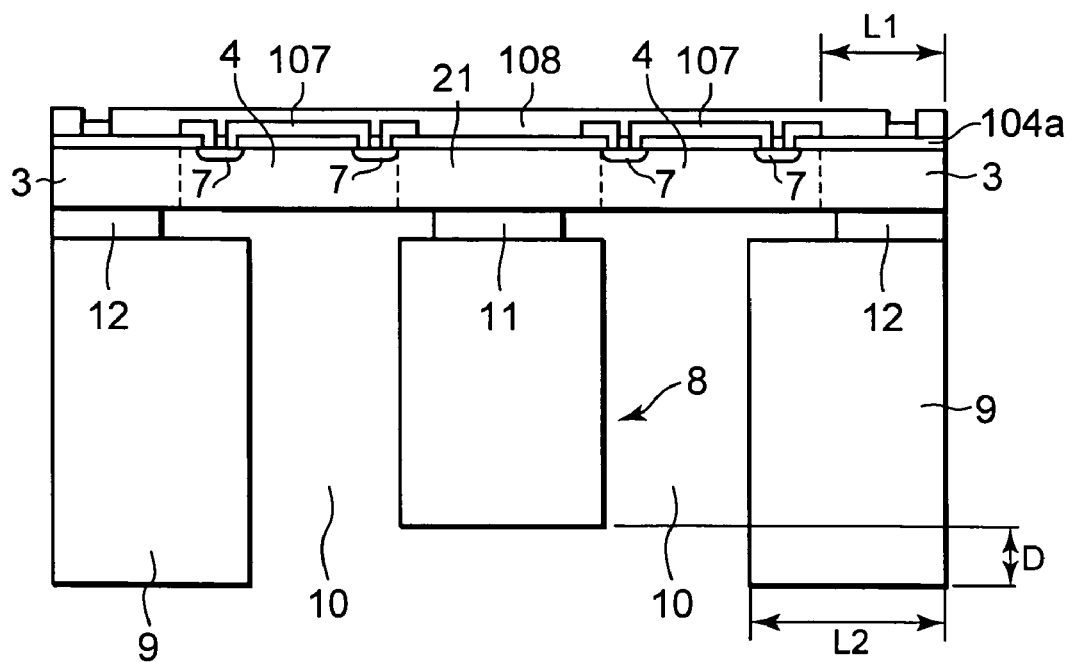
FIG. 15 shows a manufacturing process of the acceleration sensor (step 10).

Next, as shown in FIG. 15, the SOI substrate is immersed in a buffer solution containing hydrofluoric acid to remove the oxide film 109 while etching the dielectric film 103. The regions of the dielectric film 103 that are exposed to the buffer solution through the first and second grooves 5 and 10 are etched away to form the mass-weight interlayer 11 between the mass 2 and the weight 8, and the peripheral interlayer 12 between the support frame 3 and the pedestal 9. In this etching process, the mass-weight interlayer 11 and the peripheral interlayer 12 are etched enough to side-etch the edges of undesired regions sandwiched between the mass 2 and the weight 8, and between the support frame 3 and the pedestal 9 so that the dielectric film 103 will not remain intact on the edges between the undersurface of the beams 4 and the upper surface of the pedestal 9. Such a side-etching is required for the following reason: Even when the support frame 3 is formed narrower in width than the pedestal 9 to extend the beams 4 in a manner to overlap the pedestal 9, if undesired parts of the dielectric film 103 (peripheral interlayer 12) remain intact between the beams 4 and the pedestal 9, the beams 4 cannot bend in the area from which the undesired parts of the dielectric film 103 have not be removed. In this case, it does not provide any essential extension of the beams 4. In other words, only the complete removal of the dielectric film 103 (peripheral interlayer 12) from the area between the beams 4 and the pedestal 9 will enable even the part of each beam 4 extended to overlap the pedestal 9 to bend up and down or sideways. This can result in an essential extension of the beams 4.

(3) Effects

As described above, the acceleration sensor 1 features that the width (first width L1) of the support frame 3 is set narrower than the width (second width L2) of the pedestal 9 all around its inside perimeter, so that the beams 4 can be extended by a length corresponding to the reduced width of the support frame 3. Thus, even if the acceleration sensor 1 is made more compact, the deterioration of detection sensitivity can be prevented, thereby providing a compact, high-sensitivity acceleration sensor 1.

Since the width of the support frame 3 is formed narrower than that of the pedestal 9 all around its perimeter to extend the beams 4, adequate width of the pedestal 9 can also be ensured, thereby ensure adequate mechanical strength of the acceleration sensor 1.

Further, although the first semiconductor film 101 is processed in such a manner that the beams have substantially the same thickness as the support frame 3 and the mass 2, the support frame 3 and the pedestal 9 are connected through the peripheral interlayer 12 of the dielectric film 103 buried between the first semiconductor film 101 and the second semiconductor film 102. Therefore, as shown in FIG. 4, a predetermined clearance is also created between the beams 4 and the pedestal 9, so that even the parts of the beams 4 that overlap the pedestal 9, that is, the extended parts, can be flexible enough to bend up and down or sideways.

In the manufacturing method of the acceleration sensor 1, since existing semiconductor process technology can be used, the acceleration sensor can be manufactured easily at low cost. In other words, this manufacturing method is the following: The SOI substrate is first prepared, and the first and second grooves 5 and 10 are formed in the first and second semiconductor films 101 and 102 by etching and the like. After that, the dielectric film 103 as a buried layer is processed to form the acceleration sensor 1. Since this method can omit the process to bond the substrates, it makes the manufacturing processes easier and inexpensive.

While the above describes a piezoresistive acceleration sensor, even if the above-mentioned structure is applied to any other capacitive or piezoelectric acceleration sensor, the same effects can be obtained.

According to the present invention, since the acceleration sensor is formed in such a manner that the width of the support frame is narrower than the width of the pedestal all around its perimeter, the beams can be extended by a length corresponding to the reduced width of the support frame. Therefore, even when the acceleration sensor is made more compact, the deterioration of detection sensitivity can be prevented, thereby providing a compact, high-sensitivity acceleration sensor.

According to the present invention, since the manufacturing method of the acceleration sensor uses a multilayer substrate with the first and second layers formed on both sides of the third layer, and processes the first and second layers formed on opposite sides to each other by etching and the like to process the third layer by etching and the like, thus manufacturing the acceleration sensor. Since this method does not need the process to bond the substrates, it makes easier the manufacturing processes of the acceleration sensor.

What is claimed is:

1. An acceleration sensor, comprising:
   a weight;
   a pedestal arranged around the periphery of said weight;
   a support frame arranged along said pedestal and formed to have a width narrower than that of said pedestal all around its perimeter;
   a mass attached to said weight to retain said weight inside said support frame; and
   beams connecting said support frame and said mass, and overlapping said pedestal near their ends on the support frame side.

2. An acceleration sensor according to claim 1, wherein
   said support frame and said beams have substantially the same thickness, and
   said acceleration sensor further comprises a peripheral interlayer arranged between said support frame and said pedestal to create a predetermined clearance between said pedestal and the parts of said beams that overlap said pedestal.

3. An acceleration sensor according to claim 1, wherein said acceleration sensor is formed by etching a multilayer substrate.

4. An acceleration sensor according to claim 3, wherein
   the multilayer substrate is a substrate with first and second layers formed on both sides of a third layer,
   said mass, said support frame, and said beams are formed in said first layer,
   said weight and said pedestal are formed in said second layer, and
   said peripheral interlayer is formed in said third layer.

5. An acceleration sensor according to claim 4, wherein the multilayer substrate is an SOI substrate with first and second semiconductor films formed on both sides of a dielectric film.

6. An acceleration sensor according to claim 1 further comprising strain detection means arranged in said beams.

7. A manufacturing method of an acceleration sensor, comprising:
   a first step of preparing a multilayer substrate with first and second layers formed on both sides of a third layer;
   a second step of forming first grooves in the first layer to form a mass, a support frame surrounding the periphery of the mass, and beams connecting the mass and the support frame;
   a third step of forming second grooves in the second layer to form a pedestal arranged along the support frame, and a weight secured to the mass inside the pedestal; and
   a fourth step of removing parts of the third layer that are exposed through the first and second grooves and where in the second step the support frame is formed to have a width narrower than the width of the pedestal all around its perimeter so that the beams will overlap the pedestal near their ends on the support frame side.

8. A manufacturing method of an acceleration sensor according to claim 7, wherein
   in said second step, the mass and the support frame are formed to have substantially the same thickness, and
   in said fourth step, a peripheral interlayer is formed between the support frame and the pedestal in a manner to create a predetermined clearance between the pedestal and the parts of the beams that overlap the pedestal.

9. A manufacturing method of an acceleration sensor according to claim 7, wherein said third step further comprises
   a step of forming a hard mask pattern that covers a region for pedestal formation on the surface of the second layer to form a resist pattern that covers regions for the formation of the hard mask pattern and the weight,
   a step of etching using the resist pattern to form the second grooves in such a manner that a predetermined thickness remains intact in the second layer so as to separate the pedestal and the weight, and
   a step of removing the resist pattern, etching the bottom faces of the second grooves and the weight in such a state to cover the pedestal with the hard mask pattern, and exposing corresponding parts of the third layer through the second grooves while forming a predetermined step height between the weight and the pedestal.

10. A manufacturing method of an acceleration sensor according to claim 9, wherein the step height between the weight and the pedestal is substantially the same as a predetermined film thickness of the second layer remaining in the second grooves.

11. A manufacturing method of an acceleration sensor according to claim 7, wherein the multilayer substrate is an SOI substrate with first and second semiconductor films formed on both sides of a dielectric film.

12. A manufacturing method of an acceleration sensor according to claim 7 further comprising a fifth step of forming strain detection means in the beams.

* * * * *